United States Patent
Martinez et al.

(10) Patent No.: US 10,247,615 B2
(45) Date of Patent: Apr. 2, 2019

(54) SENSOR ASSEMBLIES AND METHODS OF MAKING SAME

(71) Applicant: DUNAN SENSING, LLC, San Jose, CA (US)

(72) Inventors: Claudio Martinez, Deer Park, WA (US); Danny (Duy) Do, San Jose, CA (US)

(73) Assignee: DUNAN SENSING, LLC, San Jose, CA (US)

( * ) Notice: Subject to any disclaimer, the term of this patent is extended or adjusted under 35 U.S.C. 154(b) by 176 days.

(21) Appl. No.: 15/589,578

(22) Filed: May 8, 2017

(65) Prior Publication Data

US 2018/0321088 A1    Nov. 8, 2018

(51) Int. Cl.
| | |
|---|---|
| G01K 1/14 | (2006.01) |
| G01K 13/02 | (2006.01) |
| G01D 11/30 | (2006.01) |
| G01K 1/08 | (2006.01) |
| G01K 7/22 | (2006.01) |

(52) U.S. Cl.
CPC ............... G01K 1/08 (2013.01); G01K 7/226 (2013.01)

(58) Field of Classification Search
CPC ........ G01D 11/30; G01D 11/245; G01K 1/14; G01K 13/02; G01K 7/00; G01K 1/08
USPC ...................................................... 73/866.5
See application file for complete search history.

(56) References Cited

U.S. PATENT DOCUMENTS

| | | | | |
|---|---|---|---|---|
| 5,948,989 A | * | 9/1999 | Ichikawa | G01L 19/0084 73/708 |
| 6,003,379 A | * | 12/1999 | Ichikawa | G01L 19/0092 73/708 |
| 6,588,931 B2 | * | 7/2003 | Betzner | G01K 7/22 338/22 R |
| 7,467,891 B2 | * | 12/2008 | Gennissen | G01K 13/02 374/141 |
| 7,490,510 B2 | * | 2/2009 | Agami | G01K 13/02 73/170.02 |
| 7,934,868 B2 | * | 5/2011 | Kubota | B01D 53/56 374/29 |
| 8,523,432 B2 | * | 9/2013 | Mujumdar | G01K 1/14 374/208 |
| 8,814,428 B2 | * | 8/2014 | Chancy | G01B 5/0014 136/230 |
| 8,911,148 B2 | * | 12/2014 | Martensson | G01K 1/08 338/226 |
| 9,638,600 B2 | * | 5/2017 | Haywood | G01L 19/0084 |
| 9,709,461 B2 | * | 7/2017 | Lenferink | G01K 1/14 |

(Continued)

*Primary Examiner* — Gail Kaplan Verbitsky
(74) *Attorney, Agent, or Firm* — Hackler Daghighian Martino & Novak

(57) ABSTRACT

A sensor assembly is provided that allows for a more rapid sensing of thermal changes. In preferred embodiments, the sensor assembly includes a housing, sensor package, bushing, coupling and gasket. The bushing is made from a conductive material like copper or silver and provides a conductive path from the bottom of the sensor package directly into the medium whose temperature is to be sensed or close thereto. A coupling is provided between the conductive bushing the metal housing to prevent heat exchange between the metal housing and the bushing. The gasket is placed in compression and provides a constant force holding the conductive bushing against the bottom of the sensor package.

20 Claims, 4 Drawing Sheets

(56) References Cited

U.S. PATENT DOCUMENTS

| | | | |
|---|---|---|---|
| 2006/0215731 A1* | 9/2006 | Gadonniex | G01K 1/16 374/208 |
| 2007/0121701 A1* | 5/2007 | Gennissen | G01K 13/02 374/143 |
| 2009/0034584 A1* | 2/2009 | Ehinger | G01K 1/08 374/208 |
| 2015/0110148 A1* | 4/2015 | Arunasalam | G01K 13/02 374/1 |

* cited by examiner

SENSOR ASSEMBLIES AND METHODS OF MAKING SAME

FIELD

The present patent document relates generally to sensor assemblies and methods of making the same. More specifically, the present patent document relates to sensor assemblies and sensor housing designs that improve the temperature response time of thermal sensors.

BACKGROUND

There are millions of sensors and millions of sensor assembly designs. In many implementations, it is desirable to have a sensor that can sense a change in the environment as quickly as possible. This is referred to as the sensor's response time.

Another important aspect of a sensor design is the ability to hermetically seal the sensor to the system. This is more challenging in systems with high pressures. Because it is important to accomplish a hermetic seal, often times sensor housing designs are driven by the requirement to maintain a hermetic seal. It is desirable to create a sensor housing design that allows a sensor to be hermetically sealed to the housing and also allows a rapid response time.

SUMMARY OF THE EMBODIMENTS

Objects of the present patent document are to provide improved sensor assemblies and methods of assembling sensors that allow a quicker temperature response time by a temperature sensor. To this end, a sensor assembly design is provided. The sensor assemblies include a thermally conductive bushing and an insulating coupling. The conductive bushing is held in compression with the sensor package via a compressed gasket or o-ring. In operation, the thermally conductive bushing allows a heat flow path directly from the medium to the sensor package. The insulating coupling isolates the heat flow path from the housing and other influences to allow a more accurate response.

In some embodiments, the sensor assembly comprises: a housing with an internal cavity, a port and a tubular section providing access from the port to the cavity; a sensor package located inside the cavity and including a thermal sensor, a sensor package bottom surface, and a sensor port in the sensor package bottom surface wherein the sensor port provides access to a sensor through the sensor package; a bushing with a body having a first end and a second end and a longitudinal axis formed therebetween, the bushing further comprising a flange on the first end of the body, the flange extending out past an outside surface of the body, the bushing further comprising a top surface and a bottom, the top surface formed by a top surface of the flange and the bottom formed by the second end, the bushing further comprising a through hole that extends completely through the bushing along the longitudinal axis, wherein the bushing is made from a material with a thermal conductivity greater than or equal to 375 W/m-K and wherein the top surface of the bushing is coupled to the bottom surface of the sensor package such that the through hole is aligned with the sensor port and the bottom of the bushing extends down into the tubular section towards the port; a coupling with a second body having a third end and a fourth end and a second longitudinal axis formed therebetween, the coupling comprising a second flange on the third end of the second body, the second flange extending out past a second outside surface of the second body, the coupling further comprising a second top surface and a second bottom, the second top surface formed by a top surface of the second flange and the second bottom formed by the fourth end, the coupling further comprising a second through hole that extends completely through the coupling along the second longitudinal axis and wherein the coupling is made from a material with a thermal conductivity less than or equal to 25 W/m-K and wherein the coupling is assembled to the sensor between the bushing and the housing such that the second outside surface is adjacent to the housing and an inside surface of the second through hole is adjacent to the outside surface; and a gasket assembled between the second top surface and a bottom surface of the flange.

In preferred embodiments, the gasket is placed in compression. Even more preferably, the gasket is compressed to 10% of its non-compressed thickness. The force supplied by the gasket is designed to keep the top surface of the bushing held in compression against the sensor package bottom surface.

In preferred embodiments, is made from copper or silver, the coupling is made from plastic and the housing is made from a metal.

Also in preferred embodiments, the bottom of the bushing extends out the port past a bottom of the housing. This allows the bushing to be in more direct contact with the medium that is trying to be measured.

DETAILED DESCRIPTION OF THE PREFERRED EMBODIMENTS

The present patent document discloses sensor packages, sensor packaging and methods of packaging sensors to allow more effective temperature sensing. Although the sensor may be any type of sensor, the preferred embodiments are designed for use with a microelectromechanical system ("MEMS") sensors. The temperature sensor may or may not be a MEMS sensor. In preferred embodiments, the temperature sensor is packaged along-side a MEMS sensor or in addition to a MEMS sensor. The main purpose of the embodiments disclosed herein is to improve the temperature response time by using a thermally conductive bushing. The thermally conductive bushing preferably extends from the temperature sensor, or as close thereto as possible, down into the medium being measured for temperature.

Figure 1:
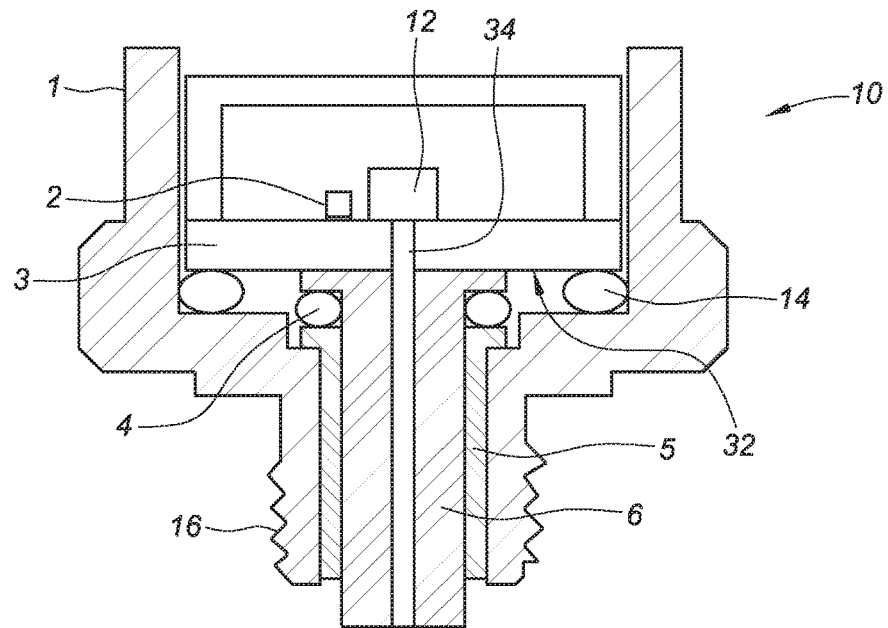
FIG. 1 illustrates a cross-section of one embodiment of a sensor assembly according to the teachings of the present patent document.

FIG. 1 illustrates a cross-section of one embodiment of a sensor assembly 10 according to the teachings of the present patent document. The sensor assembly 10 includes a housing 1, thermal sensor 2, sensor package 3, bushing 6, coupling 5, gasket 4, second gasket 14 and sensor 12. As may be seen in FIG. 1, the sensor package 3 contains the thermal sensor 2 and the sensor 12 and is assembled inside the housing 1. The thermally conductive bushing 6 extends from the bottom of the sensor package 3 down through the housing 1 to the medium that the thermal sensor 2 is trying to measure the temperature of. The thermally conductive bushing 6 allows the temperature of the medium and/or changes in the temperature of the medium, to be more rapidly sensed by the thermal sensor 2.

In operation, heat from the medium will reach the bottom of the thermally conductive bushing 6 where it will flow up the bushing 6 by conduction to the bushing flange and then through the floor of the sensor package 3 (also through conduction) to the thermal sensor 2.

In FIG. 1, the sensor package 3 includes both a thermal sensor 2 and another type of sensor 12. In other embodiments, a thermal sensor 2 may be exclusively used without the additional sensor 12. However, in preferred embodiments, the embodiments herein are design for use with MEMS sensors and MEMS sensor packages. As may be seen in FIG. 1, a sensor 12 is assembled in the sensor package 3 and the thermal sensor 2 is additional to the sensor 12. In some embodiments, the thermal sensor 2 is a thermistor. The thermistor may be a negative thermal coefficient ("NTC") thermistor or a positive thermal coefficient ("PTC") thermistor.

Figure 2:
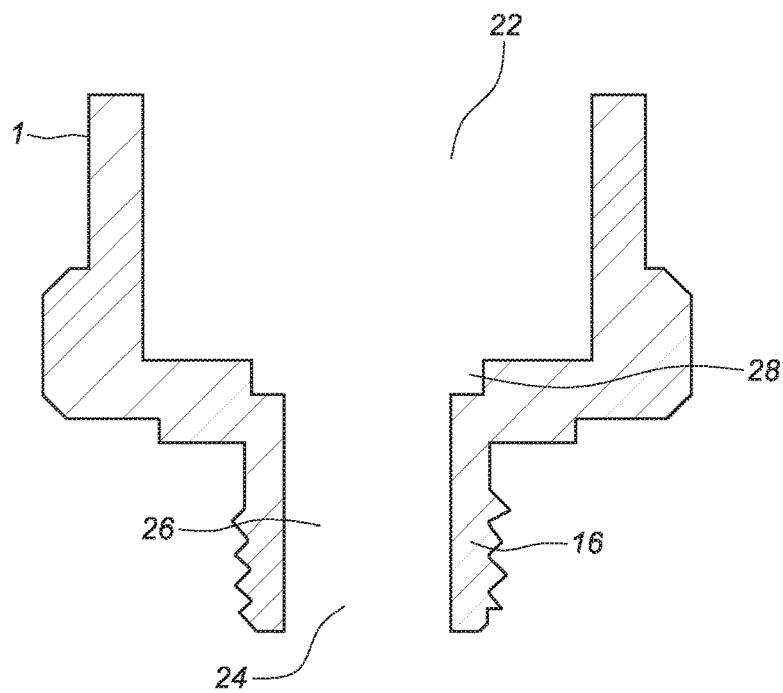
FIG. 2 illustrates a cross-section of one embodiment of a housing for use in the sensor assemblies described herein.

As may be seen in FIG. 1, in embodiments disclosed herein, thermal sensor 2 and sensor 12 are packaged inside a sensor package 3 which is assembled inside a housing 1. FIG. 2 illustrates a cross-section of one embodiment of a housing 1. Housing 1 is typically made of metal but may be made of other materials. As a few non-limiting examples, the housing 1 may be made from brass, aluminum or stainless steel, just to name a few.

The housing 1 includes an internal cavity 22, a port 24 and a passage 26 providing access from the cavity 22 to the port 24. In some embodiments, the passage 26 may be generally tubular and referred to as a tubular section 24. Preferably, the housing 1 is generally cylindrically shaped and the cavity 22 is a coaxial bore down into the cylindrically shaped body. The passage 26 preferably being a cylindrically shaped through hole that is coaxial with the cavity 22 and passes through the housing 1 from the cavity 22 to the port 24. The port 24 is the hole in the housing 1 that allows access to the medium. The portion of the housing 1 adjacent the port 24 is often threaded 16 on the outside of the housing 1 to allow the housing 1 to be screwed into a reciprocal threaded hole providing access to the medium to be sensed. As will be discussed in more detail later, some embodiments of the housing 1 include a countersink 28 in the bottom of the internal cavity 22. Preferably, the countersink 28 surrounds the passage 26.

Returning to FIG. 1, a sensor package 3 is assembled into the cavity 22 of the housing 1. The sensor package 3 is designed to house the thermal sensor 2 and sensor 12 and typically provides some type of isolation for the sensors 2 and 12 from the housing 1. The isolation provided may be thermal or mechanical (vibration) or both. In order to provide isolation, the sensor package 3 is often made form a ceramic alumina or some other type of thermally stable material. However, senor packages 3 are not limited to being made from ceramic alumina and in other embodiments, the sensor package may be made from other materials.

In the embodiment shown in FIG. 1, the sensor package 3 is an enclosed capsule that encases the sensors 2 and 12. In the embodiment shown in FIG. 1, the sensor package 3 includes a two-piece design with a base and a lid but other types of sensor packages 3 may be used.

The sensor package 3 includes a sensor port 34 in the bottom surface 32 of the sensor package 3. The sensor port 34 passes through the bottom 32 of the sensor package 3 providing access from the exterior of the sensor package 3 to the interior through the bottom surface 32. The sensor port 34 provides access to a sensor through the sensor package 3 exterior. In the embodiment shown in FIG. 1, the thermal sensor 2 is not positioned over the sensor port 34, but is mounted alongside the sensor 12, which is over the sensor port 34. Although this is the preferred embodiment, in some embodiments, the thermal sensor 2 may be mounted directly over the sensor port 34. Additional sensors may or may not be used in combination with the thermal sensor 2.

Figure 3A:
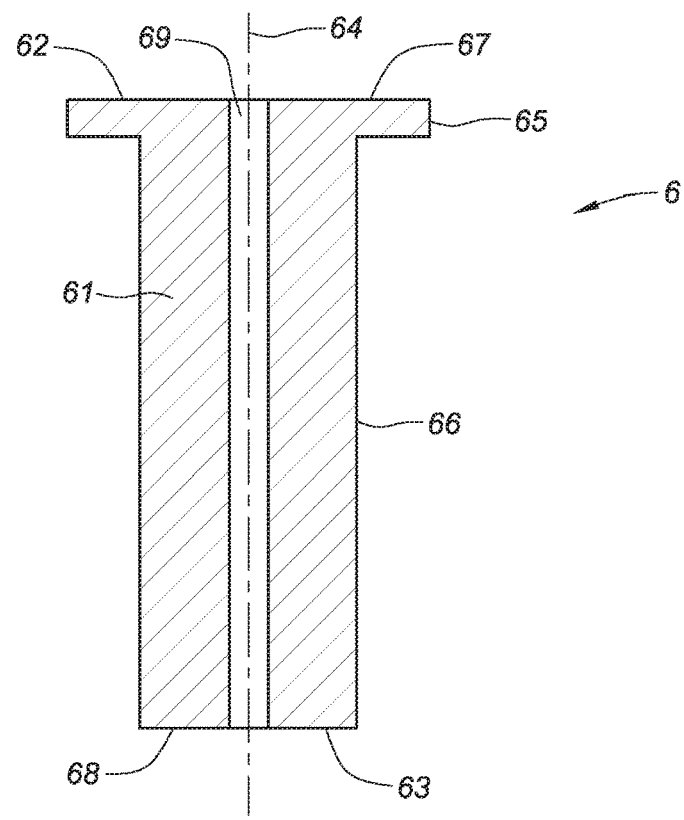
FIG. 3A illustrates a cross-section of a bushing for use in the sensor assemblies described herein.
Figure 3B:
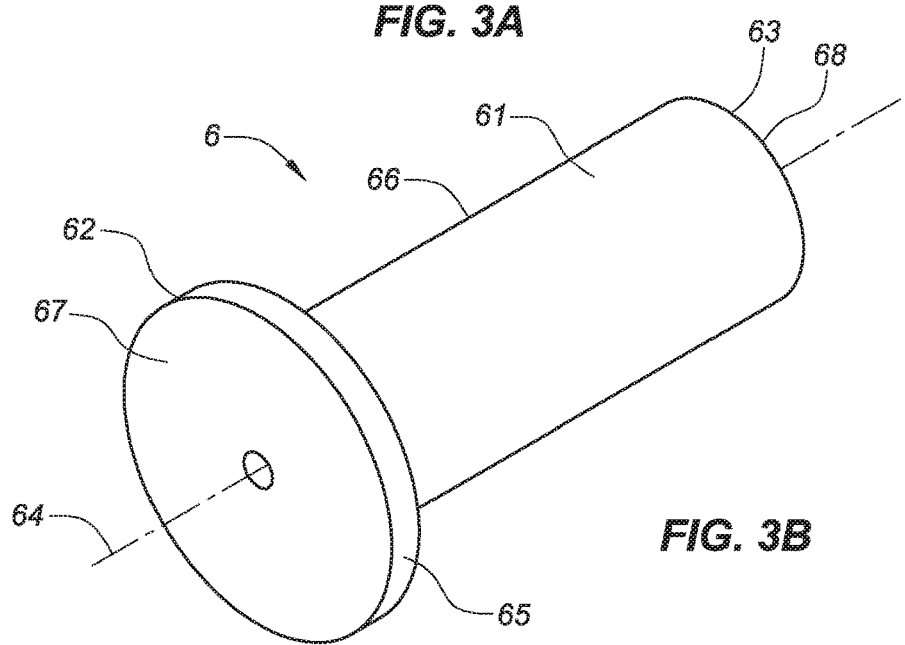
FIG. 3B illustrates an isometric view of the bushing of FIG. 3A.

FIG. 3A illustrates a cross-section of a bushing 6 for use in the sensor assemblies 10 described herein. FIG. 3B illustrates an isometric view of the bushing 6 of FIG. 3A. The bushing 6 in FIGS. 3A and 3B has a body 61 with a first end 62 and a second end 63 and a longitudinal axis 64 that runs between the first end 62 and the second end 63. In preferred embodiments, the bushing 6 further comprises a flange 65 on the first end 62. However, in some embodiments, a flange 65 is not used. As may be seen in the figures, the flange 65 extends out past the outside surface 66 of the body 61. The flange 65 may provide additional surface area to spread the heat out over the surface of the sensor package 3.

The bushing 6 further comprises a top surface 67 and a bottom surface 68. The top surface 67 is formed by, and is commensurate with, the top surface of the flange 65. The bottom surface 68 is formed by the second end 63. The bushing 6 further comprises a through hole 69. The through hole 69 extends completely through the bushing 6 along the longitudinal axis 64.

The point of the bushing 6 is to provide a conductive path in the thermal management system of the sensor assembly 10. In preferred embodiments, the bushing 6 is made from a material with a thermal conductivity greater than or equal to 300 W/m-K and more preferably greater than 375 W/m-K. Two examples of materials the bushing may be made from are copper (Cu: 386 W/m-K) and silver (Ag: 407 W/m-K). However, any material with a high thermal conductivity may be used.

Returning to FIG. 1, the bushing 6 is assembled into the sensor assembly 10 with the top surface 67 of the bushing coupled to the bottom surface 32 of the sensor package 3. In the embodiment shown in FIG. 1, the top surface 67 of the bushing 6 is in direct contact with the bottom surface 32 of the sensor package 3. The interface between the bushing 6 and the sensor package 3 does not have to be direct contact but the interface must be thermally conductive. This allows the bushing 6 to transfer heat between the sensor package 3 and the medium 6. In addition, the through hole 69 of the bushing 6 is aligned with the port 34 of the sensor package 3.

The bottom of the bushing 6 extends down into the passage 26 of the housing 1 towards the port 24. In preferred embodiments, the bottom 68 of the bushing 6 extends out of the port 24 past the bottom of the housing 1. By extending past the bottom of the housing 1, the bushing 6 may actually be immersed directly into the medium and thus, placed in direct contact with the medium when the sensor assembly 10 is assembled in the parent assembly. Direct contact with the medium helps the bushing 6 provide the temperature of the medium more quickly to the sensor package 3 and ultimately the thermal sensor 2.

As may be seen in FIG. 1, the sensor assemblies 10 may further include a coupling 5. The coupling 5 surrounds the bushing 6 and thermally isolates the bushing 6 from the housing 1. In the embodiment shown in FIG. 1, the coupling 5 has a similar design to the bushing 6 except the coupling 5 is made from a different material and has a larger through hole. Unlike the material of the bushing, which is designed to be a conductor of thermal energy, the coupling 5 is made from a material that allows the coupling 5 to insulate the bushing 6 from the thermal changes of the housing 1. In order to get an accurate reading of the temperature of the medium, the thermal sensor 2, and the conductive path to the thermal sensor 2 through the bushing 6, should not be influenced by thermal transfer through the housing 1. Because housings 1 are typically made of conductive materials like metal, a non-conductive coupling 5 is used to insulate the bushing 6 from the housing 1. The coupling 5 thermally insulates the heat flow in the bushing 6 and directs the heat towards the sensor package 3 and in turn, the thermal sensor 2.

Figure 4A:
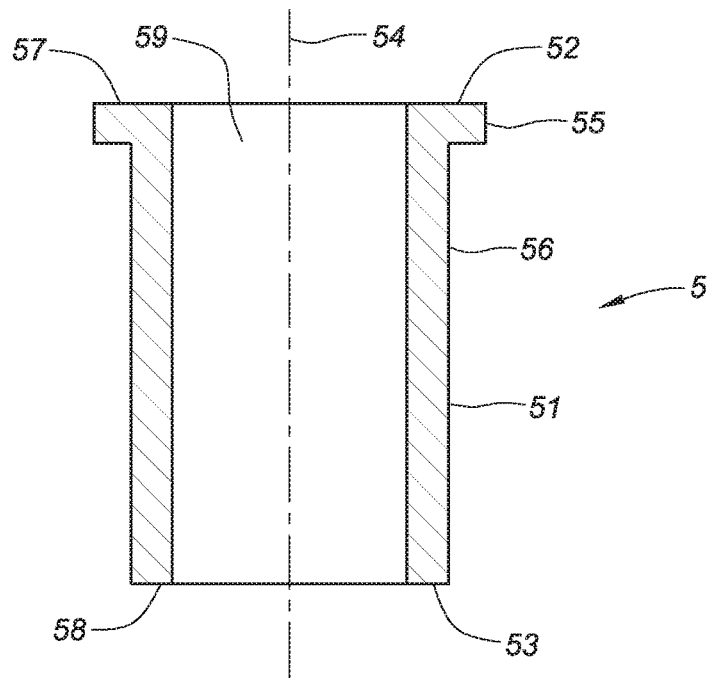
FIG. 4A illustrates a cross-section of a coupling for use in the sensor assemblies described herein.
Figure 4B:
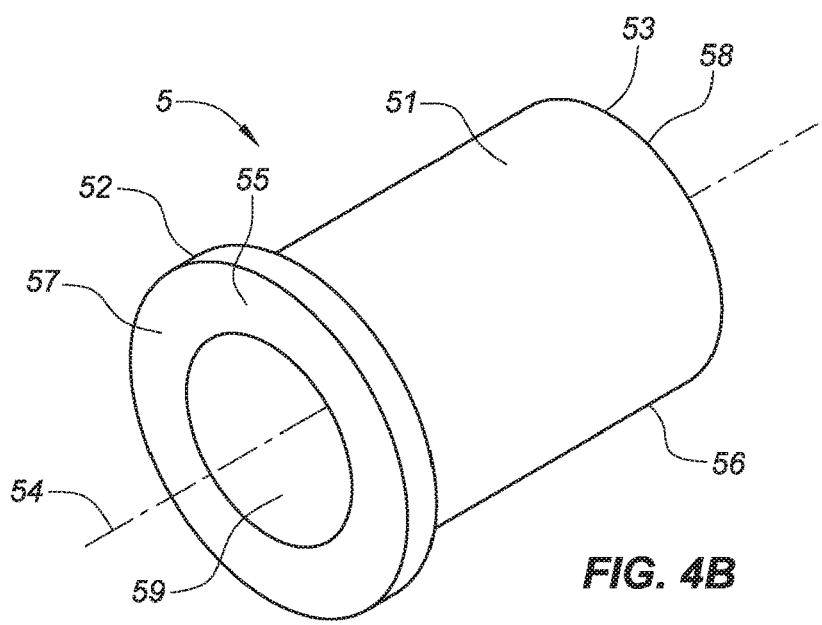
FIG. 4B illustrates an isometric view of the coupling of FIG. 4A.

FIG. 4A illustrates a cross-section of a coupling 5 for use in the sensor assemblies 10 described herein. FIG. 4B illustrates an isometric view of the coupling 5 of FIG. 4A. The coupling 5 in FIGS. 4A and 4B has a body 51 with a third end 52 and a fourth end 53 and a longitudinal axis 54 that runs between the third end 52 and the fourth end 53. In preferred embodiments, the coupling 5 further comprises a flange 55 on the first end 52. However, in some embodiments, a flange 55 is not used. As may be seen in the figures, the flange 55 extends out past the outside surface 56 of the body 51. The coupling 5 also has a machined flat to avoid a differential pressure in the pocket between the two lower o-ring seals to the outside.

The coupling 5 further comprises a top surface 57 and a bottom surface 58. The top surface 57 is formed by, and commensurate with, the top surface of the flange 55. The bottom surface 58 is formed by the second end 53. The coupling 5 further comprises a through hole 59. The through hole 59 extends completely through the bushing along the longitudinal axis 54.

The point of the coupling 5 is that of an insulator to prevent the flow of thermal energy between the bushing 6 and the housing 1. In preferred embodiments, the coupling 5 is made from a material with a thermal conductivity less than or equal to 25 W/m-K. In preferred embodiments, the coupling 5 is made from plastic. However, in other embodiments, other materials may be used. In embodiments where high temperatures may be experienced, the coupling 5 may be made from a high temperature plastic.

Returning to FIG. 1, the coupling 5 is assembled into the sensor assembly 10 between the bushing 6 and the housing 1 such that the second outside surface 56 of the coupling 5 is adjacent to the housing 1 and an inside surface of the second through hole 59 is adjacent to the outside surface 66 of the bushing 6. The interfaces between the coupling 5 and the bushing 6, and the coupling 5 and the housing 1, do not have to be direct contact. In fact, air is a great insulator and the object of the coupling 5 is to maintain a non-conductive gap between the bushing 6 and the housing 1. To this end, in other embodiments, additional insulating elements may be placed between the bushing 6 and the housing 1 without departing from the scope of the present inventions.

Returning to FIG. 1, some embodiments further include a gasket/o-ring 4. In order to make sure that the bushing 6 stays thermally coupled to the sensor package 3, some embodiments may further comprise a gasket 4. In preferred embodiments, the gasket is assembled between the bushing 6 and the coupling 5, or the bushing 6 and the housing 1. In preferred embodiments, where both the bushing 6 and coupling 5 have a flange, the gasket 4 may be installed between the second top surface 57 of the coupling 5 and the bottom surface of the flange 65 of the bushing 6. In other embodiments, the gasket 4 may be installed between the bushing 6 and the housing 1. In such embodiments, the gasket 4 should be made out of a thermally insulating material so that the gasket 4 does not conduct heat between the housing 1 and the bushing 6.

The purpose of the gasket 4 is to keep the bushing 6 in contact with the sensor package 3, even if vibrational loads are encountered. In preferred embodiments, the gasket 4 is placed in compression such that it applies a constant force to hold the bushing 6 against the sensor package 3. In preferred embodiments, the gasket 4 is assembled below the flange 65 of the bushing 6 and applies an upward force to the bushing 6 and presses the top surface 67 of the bushing 6 against the bottom surface 32 of the sensor package 3. However, in other embodiments, the gasket 4 may be installed above the sensor package 3 between the top of the sensor package 3 and the housing 1 and apply a downward force on the sensor package 3 onto the bushing 6.

In some embodiments, the gasket 4 is compressed to 30% or less of its non-compressed thickness. In preferred embodiments, the gasket 4 is compressed to 10% or less of its non-compressed thickness.

As may be seen in FIG. 1, the sensor assembly 10 may further comprise a second gasket/o-ring 14. The second gasket 14 is assembled between the bottom surface 32 of the sensor package 3 and the top surface of the cavity 22 of the housing 1. Accordingly, the second gasket 14 is preferably made of a non-conductive material. The second gasket 14 is preferably positioned around the outside edge of the sensor package 3 and helps balance the sensor package 3 within the housing so it does not rock on its center axis. In some embodiments, the gasket 4 and second gasket 14 may be made from a single piece.

As may be further appreciated in FIG. 2, some embodiments of the housing 1 include a countersink 28. The countersink 28 preferably surrounds the passage 26 in the bottom surface of the cavity 22. The countersink 28 provides a notch for the flanges of the coupling 5 and bushing 6 to rest on top of. Using a countersink 28 can lower the final height profile of the sensor assembly 10.

Although any number of sensors 12 and temperature sensors 2 may be used, the minimum requirement is at least one temperature sensor 2. In some embodiments, the temperature sensor 2 is used in combination with another sensor 12. In some examples, the sensor 12 is a MEMS pressure sensor that is measuring the pressure of a medium. In even more preferred embodiments, sensor 12 is a MEMS pressure sensor using a diaphragm to measure the pressure of the medium.

Figure 5:
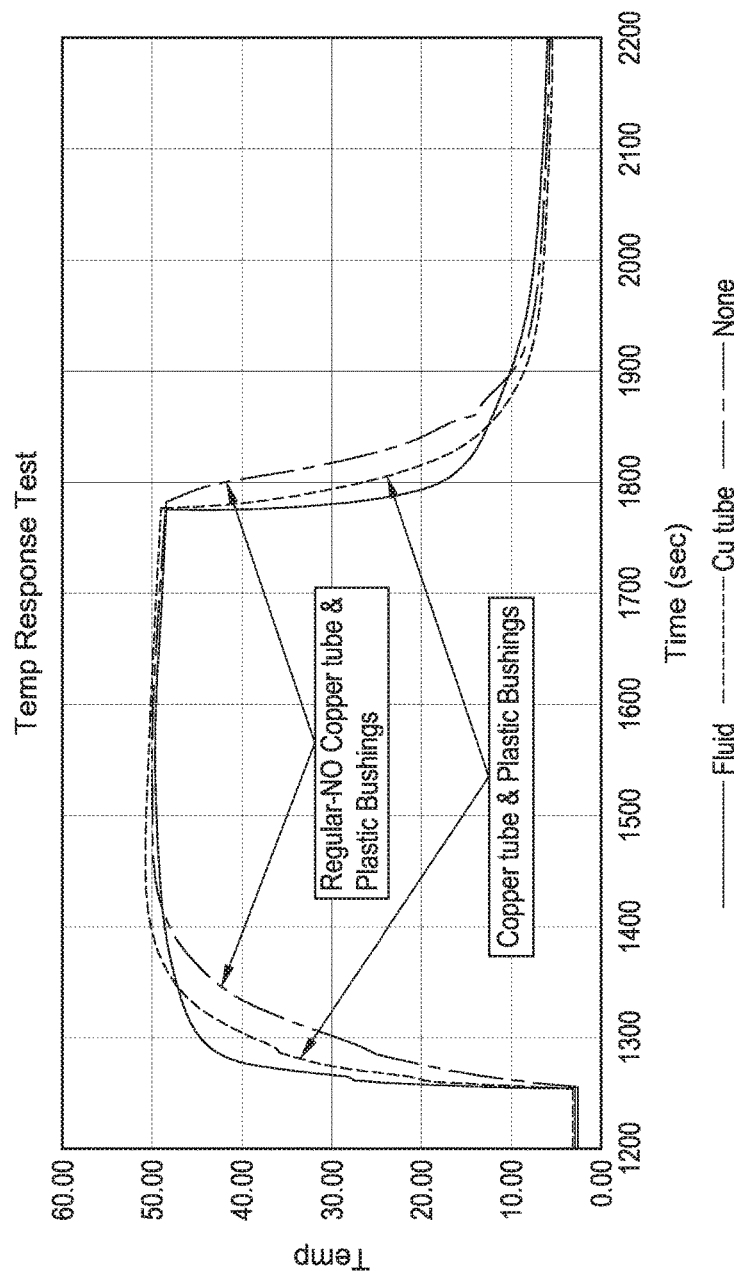
FIG. 5 illustrates a graph of the response times of a sensor assembly according to the teachings herein versus a conventional sensor assembly design.

It has been tested and proven that the embodiments herein will direct the heat flow path to the thermal sensor 2 faster and more efficiently than conventional designs. FIG. 5 illustrates a graph of the response times of a sensor assembly 10 according to the teachings herein versus a conventional sensor assembly design. As may be seen in FIG. 5, the embodiments of sensor assemblies 10 disclosed herein more rapidly sense a change in temperature and stabilized at the final temperature more quickly.

Although the specification has explained the embodiments with reference to specific figures and examples, those descriptions are provided for example only and should not limit the full scope of the embodiments as claimed below.

What is claimed is:

1. A sensor assembly comprising:
a metal housing with an internal cavity, a port and a tubular section providing access from the port to the cavity;
a sensor package located inside the cavity and including a thermal sensor, a sensor package bottom surface, and a sensor port in the sensor package bottom surface wherein the sensor port provides access to a sensor through the sensor package;
a bushing with a body having a first end and a second end and a longitudinal axis formed therebetween, the bushing further comprising a flange on the first end of the body, the flange extending out past an outside surface of the body, the bushing further comprising a top surface and a bottom, the top surface formed by a top surface of the flange and the bottom formed by the second end, the bushing further comprising a through hole that extends completely through the bushing along the longitudinal axis, wherein the bushing is made from a material with a thermal conductivity greater than or equal to 375 W/m-K and wherein the top surface of the bushing is coupled to the bottom surface of the sensor package such that the through hole is aligned with the sensor port and the bottom of the bushing extends down into the tubular section towards the port;
a coupling with a second body having a third end and a fourth end and a second longitudinal axis formed therebetween, the coupling comprising a second flange on the third end of the second body, the second flange extending out past a second outside surface of the second body, the coupling further comprising a second top surface and a second bottom, the second top surface formed by a top surface of the second flange and the second bottom formed by the fourth end, the coupling further comprising a second through hole that extends completely through the coupling along the second longitudinal axis and wherein the coupling is made from a material with a thermal conductivity less than or equal to 25 W/m-K and wherein the coupling is assembled to the sensor between the bushing and the housing such that the second outside surface is adjacent to the housing and an inside surface of the second through hole is adjacent to the outside surface; and
a gasket assembled between the second top surface and a bottom surface of the flange.

2. The sensor assembly of claim 1, wherein the gasket is placed in compression.

3. The sensor assembly of claim 2, wherein the gasket is compressed to 10% of its non-compressed thickness.

4. The sensor assembly of claim 1, wherein the bushing is made from copper.

5. The sensor assembly of claim 1, wherein the bushing is made from silver.

6. The sensor assembly of claim 1, wherein the gasket causes the top surface to be held in compression against the sensor package bottom surface.

7. The sensor assembly of claim 1, wherein the coupling is made from plastic.

8. The sensor assembly of claim 1, wherein the bottom of the bushing extends out the port past a bottom of the housing.

9. A sensor assembly comprising:
a housing including an internal cavity, a port and a passage providing access from the port to the cavity;
a sensor package located inside the cavity and including a sensor, a sensor package bottom surface, and a sensor port in the sensor package bottom surface wherein the sensor port provides access to the sensor through the sensor package;
a bushing with a body having a first end and a second end and a longitudinal axis formed therebetween, the first end forms a top surface and the second end forms a bottom, the bushing further comprising a through hole that extends completely through the bushing along the longitudinal axis, wherein the bushing is made from a material with a thermal conductivity greater than or equal to 375 W/m-K and wherein the top surface of the bushing is coupled to the bottom surface of the sensor package such that the through hole is aligned with the sensor port and the bottom of the bushing extends down into the passage towards the port;
a coupling with a second body having a third end and a fourth end and a second through hole that extends completely through the coupling from the third end to the fourth end, wherein the coupling is made from a material with a thermal conductivity less than or equal to 25 W/m-K and wherein the coupling is assembled between the bushing and the housing such that the longitudinal axis of the bushing extends down into the second through hole of the coupling and the coupling surrounds the bushing; and
a gasket placed in compression and positioned to force the top surface of the bushing against the sensor package bottom surface.

10. The sensor assembly of claim 9, wherein the gasket is compressed to 10% of its non-compressed thickness.

11. The sensor assembly of claim 1, wherein the bushing is made from copper.

12. The sensor assembly of claim 1, wherein the bushing is made from silver.

13. The sensor assembly of claim 1, wherein the coupling is made from plastic.

14. The sensor assembly of claim 1, wherein the bottom of the bushing extends out the port past a bottom of the housing.

15. A sensor assembly comprising:
a housing including an internal cavity, a port and a passage providing access from the port to the cavity;
a sensor package located inside the cavity, wherein the sensor package has a sensor package bottom surface and a sensor port in the sensor package bottom surface wherein the sensor port provides access to an interior of the sensor package;
a bushing having a cylindrically shaped body with a flange at one end and a through hole that runs coaxially along the cylindrically shaped body, wherein the bushing is made from a material with a thermal conductivity greater than or equal to 375 W/m-K and wherein the flange is coupled to the bottom surface of the sensor package such that the through hole is aligned with the sensor port and the cylindrically shaped body extends down into the passage towards the port;
a coupling having a second cylindrically shaped body with a second flange at one end and a second through hole that runs coaxially along the second cylindrically shaped body, wherein the coupling is made from a material with a thermal conductivity less than or equal to 25 W/m-K and wherein the coupling is assembled between the bushing and the housing such that the cylindrically shaped body of the bushing extends down into the second through hole and the coupling surrounds the cylindrically shaped body of the bushing; and a gasket placed in compression and positioned to force the top surface of the bushing against the sensor package bottom surface.

16. The sensor assembly of claim 15, wherein the gasket is compressed to 30% or less of its non-compressed thickness.

17. The sensor assembly of claim 15, wherein the bushing is made from copper.

18. The sensor assembly of claim 15, wherein the bushing is made from silver.

19. The sensor assembly of claim 15, wherein the coupling is made from plastic.

20. The sensor assembly of claim 15, wherein a bottom of the bushing opposite the flange extends out the port past a second bottom of the housing.

* * * * *